United States Patent
Blevins

(10) Patent No.: US 8,783,701 B1
(45) Date of Patent: Jul. 22, 2014

(54) LOWERABLE SUSPENSION FOR TRAILERS AND OTHER VEHICLES

(71) Applicant: Timothy D. Blevins, De Kalb, TX (US)

(72) Inventor: Timothy D. Blevins, De Kalb, TX (US)

(73) Assignee: Timothy D. Blevins, Dekalb, TX (US)

( * ) Notice: Subject to any disclaimer, the term of this patent is extended or adjusted under 35 U.S.C. 154(b) by 0 days.

(21) Appl. No.: 13/910,488

(22) Filed: Jun. 5, 2013

(51) Int. Cl.
*B60G 3/12* (2006.01)
*B60G 3/18* (2006.01)
*B60G 7/04* (2006.01)
*B60G 9/00* (2006.01)

(52) U.S. Cl.
CPC *B60G 3/185* (2013.01); *B60G 7/04* (2013.01); *B60G 9/00* (2013.01); *B60G 2200/13* (2013.01); *B60G 2300/04* (2013.01)
USPC .............................. 280/124.128; 280/124.153

(58) Field of Classification Search
CPC ............ B60G 3/185; B60G 7/02; B60G 7/04; B60G 9/00; B60G 2204/143; B60G 2300/04; B60G 2300/13
USPC ...................... 280/124.125, 124.128, 124.153
See application file for complete search history.

(56) References Cited

U.S. PATENT DOCUMENTS

| | | | | |
|---|---|---|---|---|
| 3,099,458 | A * | 7/1963 | Wenzel et al. | 280/124.15 |
| 5,137,297 | A * | 8/1992 | Walker | 280/414.5 |
| 5,326,128 | A * | 7/1994 | Cromley, Jr. | 280/656 |
| 6,532,623 | B1 * | 3/2003 | Watanabe | 16/35 D |
| 7,726,674 | B2 * | 6/2010 | VanDenberg et al. | 280/124.128 |
| 8,182,193 | B2 * | 5/2012 | Gaudet et al. | 414/495 |
| 8,328,211 | B2 * | 12/2012 | VanDenberg et al. | 280/124.116 |
| 2011/0181006 | A1 * | 7/2011 | Heppner | 280/9 |

* cited by examiner

*Primary Examiner* — Drew Brown
*Assistant Examiner* — Timothy Wilhelm
(74) *Attorney, Agent, or Firm* — Sinorica, LLC

(57) ABSTRACT

A lowerable suspension for trailers and other vehicles allows a trailer to be lowered to a deployed position in order to allow easier access to the trailer. A suspension axle is attached to the vehicle frame. A lower swing arm and an upper stop arm are rotatably connected to the suspension axle. A rubber damper pad is connected between the lower swing arm and the upper stop arm to act as a shock absorber during transit. A wheel is rotatably connected to the lower swing arm opposite the suspension axle. The wheel is affixed into a raised or lowered position by inserting a suspension transition pin through the upper stop arm into either a transit pin hole or a deployed pin hole of a suspension transition plate that is affixed to the vehicle frame adjacent. A plurality of jacks assists with raising and lowering the vehicle frame.

10 Claims, 6 Drawing Sheets

LOWERABLE SUSPENSION FOR TRAILERS AND OTHER VEHICLES

FIELD OF THE INVENTION

The present invention relates generally to trailers. More particularly, the present invention relates to a suspension system that allows a trailer or other vehicle to be lowered close to ground level.

BACKGROUND OF THE INVENTION

A trailer is generally an unpowered vehicle pulled by a powered vehicle, which is used to transport, goods, equipment, or other materials. Many different types of trailers exist, such as travel trailers or popup campers, large semi-trailers transporting cargo, livestock trailers, food trailers, and restroom trailers.

A common practice for outdoor events such as concerts or community festivals is to provide temporary restrooms where the event does not take place at or near existing adequate facilities. Portable toilets, colloquially referred to as "porta potties", are often employed, but are cramped and typically do not have power or running water, leading to unpleasant and unsanitary conditions after repeated use. Luxury portable toilets exist which contain every amenity that a public bathroom would have such as running water, flushing toilets, stalls, minors, lighting and in some cases even air conditioning and hot water. Such luxury portable toilets are typically mounted on large "office-like" trailers or made from converted shipping containers, and are commonly found at higher end events where higher levels of convenience and comfort are desired, such as weddings, high end charity events, and movie shoots.

With typical restroom trailers, the frame is generally being positioned above the wheels required to transport the trailer, presenting a difficulty for providing access to wheelchairs and other handicapped persons, as steps, ramps and platforms must be put into place. The present invention seeks to address this difficulty by presenting a trailer suspension that allows the trailer to be lowered much closer to ground level, reducing the total height a ramp must traverse in order to provide access to the restroom compartment and reducing liability from potential falls.

DETAIL DESCRIPTIONS OF THE INVENTION

All illustrations of the drawings are for the purpose of describing selected versions of the present invention and are not intended to limit the scope of the present invention.

The present invention is a suspension system for trailers that allows the trailer to be lowered close to the ground to facilitate ease of access to the trailer. Although the present invention is primarily intended for use with a trailer, particularly a portable restroom trailer, the present invention may also be incorporated into alternate vehicle types where appropriate. In an alternate embodiment of the present invention, the trailer or alternate vehicle type may comprise drive train components common to powered vehicles, such as, but not limited to, an engine, transmission, and differential, so that the trailer or alternate vehicle type may move under its own power. In this alternate embodiment, the components and arrangement of the components of the present invention may need to be changed or rearranged slightly to accommodate the drive train components, while still reflecting the spirit of the present invention.

Figure 6:
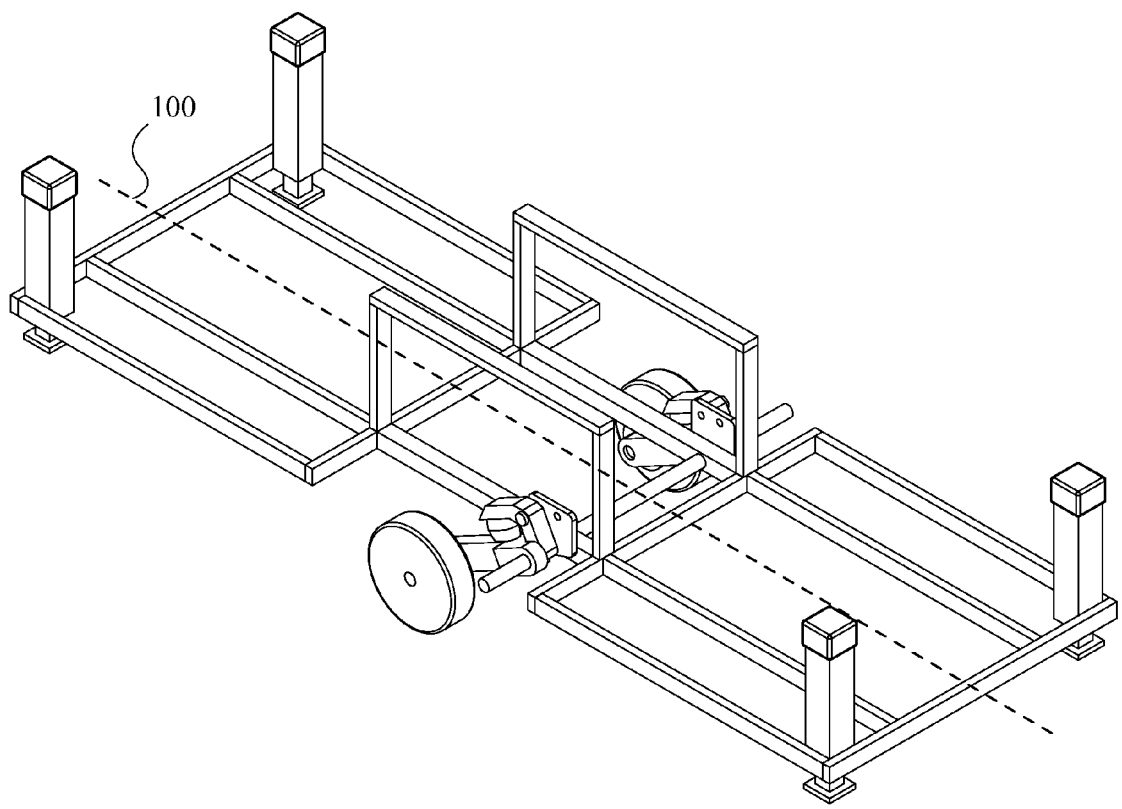
FIG. 6 is a perspective view of the present invention being mirrored for full integration into a trailer.

Referring to FIG. 6, it should be noted that the description of the present invention hereinafter applies to only one lateral side of the trailer, and should be duplicated laterally across a longitudinal central axis 100 of the trailer for correct functionality, wherein the longitudinal central axis 100 of the trailer refers to a horizontal direction parallel to the forward rolling motion of the trailer when in transit, and wherein a lateral direction is horizontal and perpendicular to the translational motion of the trainer when in transit.

Figure 1:
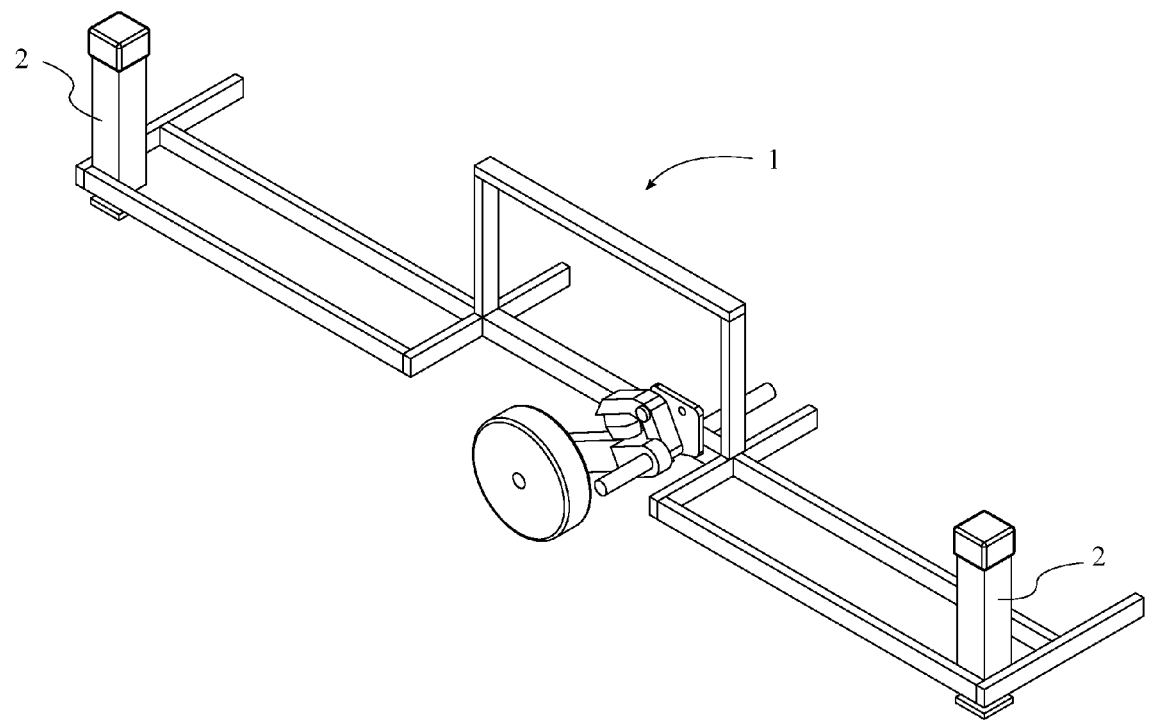
FIG. 1 is a perspective view of the present invention in the transit position.
Figure 2:
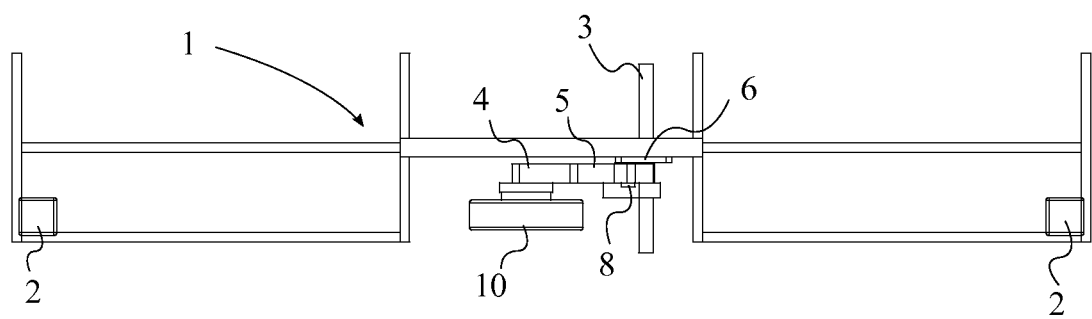
FIG. 2 is a top view of the present invention.
Figure 3:
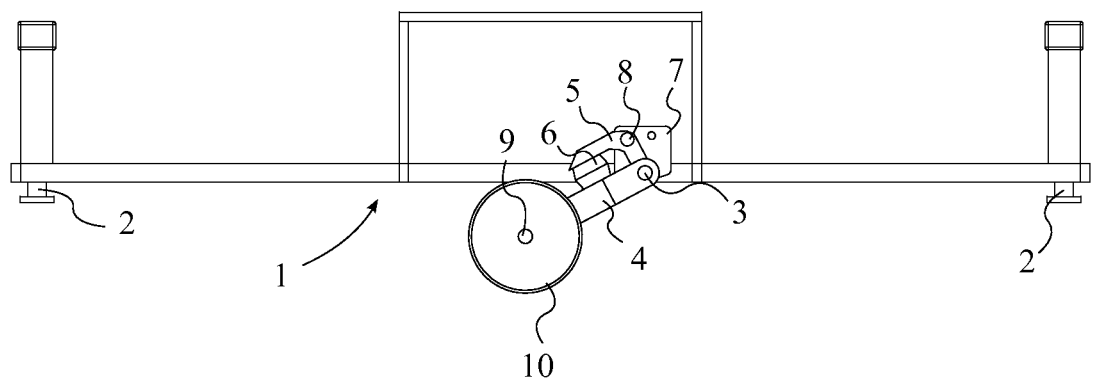
FIG. 3 is a side view of the present invention in the transit position.

Referring to FIGS. 1-3, the present invention generally comprises a vehicle frame 1, a plurality of jacks 2, a suspension axle 3, a lower swing arm 4, an upper stop arm, a suspension transition plate 7, a rubber damper pad 6, a suspension transition pin 8, a wheel axle 9, and a wheel 10. The vehicle frame 1 refers to the general structure of the trailer that gives shape to and supports the majority of the other components of the trailer, such as, but not limited to, restroom compartments or other structural components or cargo. In descriptions hereinafter the vehicle frame 1 is understood to be, but not limited to being, substantially flat.

Each of the plurality of jacks 2 is any appropriate well-known mechanism that exerts a substantial vertical force between the ground and the trailer in order to lift or lower the trailer, such as, but not limited to, a hand operated jack, a hydraulic lack, or a pneumatic jack. The plurality of jacks 2 is operatively engaged with the vehicle frame 1, wherein the vehicle frame 1 is vertically lifted or lowered by the plurality of jacks 2. The plurality of jacks 2 is positioned around the frame in any arrangement appropriate for jacking the vehicle, preferably at corners of the vehicle frame 1 or in another arrangement that balances the vertical force applied by the plurality of jacks 2.

Figure 5:
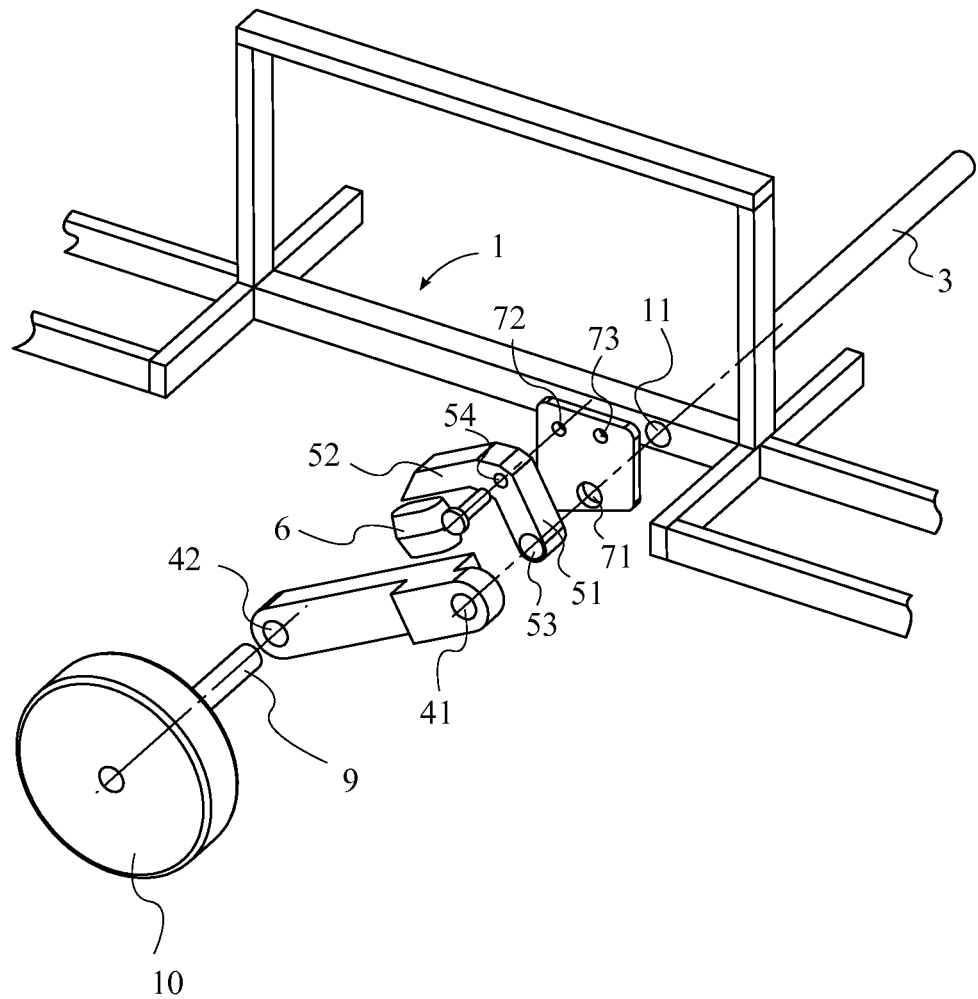
FIG. 5 is a perspective exploded view of the present invention.

Referring to FIG. 5, the vehicle frame 1 comprises an axle attachment location 11, and the suspension axle 3 is attached to the vehicle frame 1 at the axle attachment location 11. The suspension axle 3 is oriented horizontally and laterally with respect to the vehicle frame 1. The suspension axle 3 is fixed in place and does not rotate or translate with respect to the vehicle frame 1.

The lower swing arm 4 is an elongated beam-like structural member that is rotatably connected to the suspension axle 3 at one end of the lower swing arm 4 and rotatably connected to the wheel 10 by the wheel axle 9 opposite the suspension axle 3. The lower swing arm 4 comprises a first suspension axle aperture 41 and a wheel axle aperture 42. The first suspension axle aperture 41 and the wheel axle aperture 42 are oriented parallel to each other, and are positioned opposite each other along the lower swing arm 4. The lower swing arm 4 is rotatably connected to the suspension axle 3 by the first suspension axle aperture 41, allowing the wheel axle aperture 42, and therefore the wheel 10, to be radially moved about the suspension axle 3 by rotating the lower swing arm 4.

The wheel axle 9 concentrically traverses through the wheel axle aperture 42. The wheel 10 is concentrically positioned with the wheel axle 9 and is rotatably connected to the wheel axle 9; therefore, the wheel 10 is rotatably connected to the lower swing arm 4 by the wheel axle 9 opposite the suspension axle 3 along the lower swing arm 4. In an alternate embodiment of the present invention, the wheel 10 is rotatably connected to the lower swing arm 4 by other appropriate means. Additionally, in the preferred embodiment of the present invention, a wheel 10 brake is operatively engaged with the wheel 10.

The upper stop arm is also rotatably connected to the suspension axle 3, and is positioned adjacent to the suspension transition plate 7 opposite the vehicle frame 1. The upper stop arm is substantially L-shaped, and comprises an axle connection portion 51, a damper pad portion 52, a second suspension axle aperture 53 and a stop arm pin hole 54. The lower swing arm 4 is positioned adjacent to the upper stop arm opposite the suspension transition plate 7. The lower swing arm 4 preferably has slightly angled geometry that allows the third suspension axle aperture 71 of the lower swing arm 4 to be positioned adjacent to the second suspension axle aperture 53 of the upper stop arm opposite the suspension transition plate 7, while having the lower swing arm 4 being positioned under the damper pad portion 52 of the upper stop arm, so that the rubber damper pad 6 may be appropriately positioned between the lower swing arm 4 and the upper stop arm.

Figure 4:
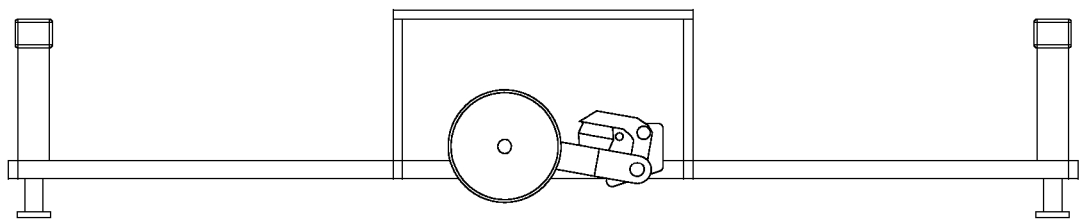
FIG. 4 is a side view of the present invention in the deployed position.

Referring to FIGS. 3-5, the rubber damper pad 6 is attached between the lower swing arm 4 and the upper stop arm, and acts as a shock absorber between the lower swing arm 4 and the upper stop arm while the present invention is transit. The rubber damper pad 6 is positioned along the lower swing arm 4 between the first suspension axle aperture 41 and the wheel axle aperture 42. Preferably, the rubber damper pad 6 is attached to the lower swing arm 4 and the upper stop arm by a pair of opposing bolts, but may be affixed in place between the lower swing arm 4 and the upper stop arm by any other appropriate hardware or other means. Since the rubber damper pad 6 is affixed between the lower swing arm 4 and the upper stop arm, the lower swing arm 4 and the upper stop arm are forced to rotate by the same angle, with a small amount of give due to deflection in the rubber damper pad 6 by compressive or tensile forces applied to the rubber damper pad 6 between the lower swing arm 4 and the upper stop arm. This allows the upper stop arm and the lower swing arm 4 to be rotated in unison so that the suspension transition pin 8 may be inserted through the stop arm pin hole 54 of the upper swing arm in order to affix the wheel 10 in a lowered wheel position or in a raised wheel position, respectively.

Referring to FIG. 5, the axle connection portion 51 of the upper stop arm is rotatably connected to the suspension axle 3 at the second suspension axle aperture 53. The damper pad portion 52 is attached to the axle connection portion 51 opposite the second suspension axle aperture 53 and is oriented perpendicular to the axle connection portion 51, forming an L shape. The damper pad portion 52 is positioned adjacent to the rubber damper pad 6 opposite the lower swing arm 4, wherein the damper pad portion 52 is parallel to the lower swing arm 4. The stop arm pin hole 54 is positioned between the axle connection portion 51 and the damper pad portion 52. The second suspension axle aperture 53 is positioned on the axle connection portion 51. The stop arm pin hole 54 and the second suspension axle aperture 53 are oriented parallel to each other.

The suspension transition plate 7 comprises a third suspension axle aperture 71, a transit position pin hole 72, and a deployed position pin hole 73. The suspension transition plate 7 is attached to the vehicle frame 1 adjacent to the axle attachment location 11. The third axle aperture, the transit position pin hole 72 and the deployed position pin hole 73 are oriented parallel to each other. The transit position pin hole 72 and the deployed position pin hole 73 are positioned equidistant from the third suspension aperture, wherein the distance between the third suspension axle aperture 71 and the transit position pin hole 72, the distance between the third suspension axle aperture 71 and the deployed position pin hole 73, and the distance between the second suspension axle aperture 53 and the stop arm pin hole 54 are equal. This allows the upper stop arm to be rotated so that the stop arm pin hole 54 is concentric with either the transit position pin hole 72 or the deployed position pin hole 73.

The first suspension axle aperture 41, the second suspension axle aperture 53, and the third suspension axle aperture 71 are concentrically positioned with each other. The first suspension axle aperture 41 is positioned adjacent to the second axle suspension aperture, and the third suspension axle aperture 71 is positioned adjacent to the second suspension axle aperture 53. The suspension axle 3 concentrically traverses through the first suspension axle aperture 41, the second suspension axle aperture 53 and the third suspension axle aperture 71.

Referring to FIGS. 3-4, the lowered wheel position of the wheel 10 corresponds to a transit position of the present invention, and the raised wheel position of the wheel 10 corresponds to a deployed position of the present invention. In the transit position, the trailer is able to be towed to a desired location since vehicle frame 1 is held sufficiently raised above the ground for safe transport due to the lowered wheel position, in which the wheel 10 is positioned sufficiently below the vehicle frame 1 to allow for safe transit. In the deployed position, the vehicle frame 1 is very close to the ground, allowing much easier access to a restroom trailer or other compartments or cargo held by the vehicle frame 1. In the deployed position, the vehicle frame 1 is supported mostly by the plurality of jacks 2, while the wheel 10 has been rotated upward into the raised wheel position where the wheel 10 is recessed upward into the vehicle frame 1. Preferably, in the deployed position, the wheel 10 does still contact the ground in order to provide additional support of the vehicle frame 1 to the plurality of powered jacks, but the majority of the weight of the trailer is resting on the plurality of jacks 2 instead of the wheel 10.

In the transit position, the suspension transition pin 8 is removably inserted through the stop arm pin hole 54 and the transit position pin hole 72 in order to affix the wheel 10 in the lowered wheel position. In the deployed position, the suspension transition pin 8 is removably inserted through the stop arm pin hole 54 and the deployed position pin hole 73 in order to affix the wheel 10 in the raised wheel position.

An example of using the present invention follows. Initially, the trailer is in a storage location in the deployed position, with the suspension transition pin 8 inserted through the stop arm pin hole 54 and the deployed position pin hole 73. The plurality of jacks 2 is activated, expanding vertically and lifting the vehicle frame 1 a small amount, releasing frictional forces between the suspension transition pin 8, the upper stop arm and the suspension transition plate 7 so that the suspension transition pin 8 may be removed. After the suspension transition pin 8 is removed, the plurality of jacks 2 is activated again, continuing to expand vertically. Due to gravity, the wheel 10 and the lower swing arm 4 rotate about the suspension axle 3 while the plurality of jacks 2 is in operation, rotating the upper stop arm by the same angle as the lower swing arm 4 until the stop arm pin hole 54 is concentric with the transit position pin hole 72 of the suspension transition plate 7. The suspension transition pin 8 is then inserted through the stop arm pin hole 54 and the transit position pin hole 72, the trailer is attached to a towing hitch of a towing vehicle, and the plurality of jacks 2 is retracted, causing the weight of the trailer to rest solely on the wheel 10 and the towing hitch.

The trailer is then towed to a desired location, and the reverse process is carried out. The plurality of jacks 2 is expanded, contacting the ground and lifting the vehicle frame 1 slightly so that the suspension transition pin 8 may be removed. After the suspension transition pin 8 is removed, the plurality of jacks 2 is retracted, lowering the vehicle frame 1 and rotating the lower swing arm 4 and the upper stop arm until the upper stop arm achieves a position where the stop arm pin hole 54 is concentric with the deployed position pin hole 73. The suspension transition pin 8 is then inserted through the stop arm pin hole 54 and the deployed position pin hole 73, securing the present invention in the deployed position.

Although the invention has been explained in relation to its preferred embodiment, it is to be understood that many other possible modifications and variations can be made without departing from the spirit and scope of the invention as hereinafter claimed.

What is claimed is:

1. A lowerable suspension for trailers and other vehicles comprises:
   a vehicle frame;
   a plurality of powered jacks;
   a suspension axle;
   a lower swing arm;
   an upper stop arm;
   a suspension transition plate;
   a rubber damper pad;
   a pin;
   a wheel axle;
   a wheel;
   the vehicle frame comprises an axle attachment location;
   the lower swing arm comprises a first suspension axle aperture and a wheel axle aperture;
   the upper stop arm comprises an axle connection portion, a damper pad portion, a second suspension axle aperture and a stop arm pin hole;
   the suspension transition plate comprises a third suspension axle aperture, a transit position pin hole, and a deployed position pin hole;
   the plurality of powered jacks being operatively engaged with the vehicle frame,
   wherein the vehicle frame is vertically lifted or lowered by the plurality of powered jacks;
   the lower swing arm and the upper stop arm being rotatably connected to the suspension axle; and
   the wheel being rotatably connected to the lower swing arm opposite the suspension axle.

2. The lowerable suspension for trailers and other vehicles as claimed in claim 1 comprises:
   the suspension axle being oriented horizontally; and
   the suspension axle being attached to the vehicle frame at the axle attachment location, wherein the suspension axle is oriented laterally with respect to the vehicle frame.

3. The lowerable suspension for trailers and other vehicles as claimed in claim 1 comprises:
   the suspension transition plate being attached to the vehicle frame adjacent to the axle attachment location, wherein the third axle aperture is positioned adjacent to the axle attachment location;
   the third axle aperture, the transit position pin hole and the deployed position pin hole being oriented parallel to each other; and
   the transit position pin hole and the deployed position pin hole being positioned equidistant from the third suspension axle aperture, wherein the distance between the third suspension axle aperture and the transit position pin hole, the distance between the third suspension axle aperture and the deployed position pin hole, and the distance between the second suspension axle aperture and the stop arm pin hole are equal.

4. The lowerable suspension for trailers and other vehicles as claimed in claim 1 comprises:
   the upper stop arm being positioned adjacent to the suspension transition plate opposite the vehicle frame;
   the damper pad portion being positioned adjacent to the rubber damper pad opposite the lower swing arm, wherein the damper pad portion is parallel to the lower swing arm;
   the stop arm pin hole being positioned between the axle connection portion and the damper pad portion;
   the second suspension axle aperture being positioned on the axle connection portion;
   the stop arm pin hole and the second suspension axle aperture being oriented parallel to each other;
   the axle connection portion being rotatably connected to the suspension axle at the second suspension axle aperture;
   the damper pad portion being attached to the axle connection portion opposite the second suspension axle aperture,
   wherein the axle connection portion is perpendicular to the damper pad portion; and
   wherein the upper stop arm is substantially L-shaped.

5. The lowerable suspension for trailers and other vehicles as claimed in claim 1 comprises:
   the first suspension axle aperture and the wheel axle aperture being oriented parallel to each other; and
   the first suspension axle aperture and the wheel axle aperture being positioned opposite each other along the lower swing arm.

6. The lowerable suspension for trailers and other vehicles as claimed in claim 1 comprises:
   the first suspension axle aperture, the second suspension axle aperture, and the third suspension axle aperture being concentrically positioned with each other;
   the first suspension axle aperture being positioned adjacent to the second suspension axle aperture;
   the third suspension axle aperture being positioned adjacent to the second suspension axle aperture opposite the first suspension axle aperture; and
   the suspension axle concentrically traversing through the first suspension axle aperture, the second suspension axle aperture, and the third suspension axle aperture.

7. The lowerable suspension for trailers and other vehicles as claimed in claim 1 comprises: (wheel/wheel axle)
   the wheel axle concentrically traversing through the wheel axle aperture;
   the wheel being concentrically positioned with the wheel axle; and
   the wheel being rotatably connected to the wheel axle.

8. The lowerable suspension for trailers and other vehicles as claimed in claim 1 comprises:
   the rubber damper pad being attached between the lower swing arm and the upper stop arm, wherein the rubber damper pad acts as a shock absorber between the lower swing arm and the upper stop arm during transit.

9. The lowerable suspension for trailers and other vehicles as claimed in claim 1 comprises:
    the pin being removably inserted into the stop arm pin hole and the transit position pin hole in order to affix the wheel in a lowered wheel position.

10. The lowerable suspension for trailers and other vehicles as claimed in claim 1 comprises:
    the pin being removably inserted into the stop arm pin hole and the deployed position pin hole in order to affix the wheel in a raised wheel position.

* * * * *